United States Patent [19]
Yang

[11] Patent Number: 5,942,108
[45] Date of Patent: Aug. 24, 1999

[54] MULTI-PHASE DUAL CYCLE INFLUENT PROCESS

[75] Inventor: Chester Qixing Yang, Calgary, Canada

[73] Assignee: Aqua-Aerobic Systems, Inc., Rockford, Ill.

[21] Appl. No.: 08/890,231

[22] Filed: Jul. 9, 1997

Related U.S. Application Data

[60] Provisional application No. 60/022,491, Jul. 10, 1996.

[51] Int. Cl.⁶ .................................. C02F 3/12; C02F 3/30
[52] U.S. Cl. .................................. 210/195.3; 210/195.4; 210/202; 210/219; 210/253
[58] Field of Search ............................ 210/195.1, 195.3, 210/195.4, 202, 219, 253, 259, 521, 532.1, 532.2, 534

[56] References Cited

U.S. PATENT DOCUMENTS

| | | | |
|---|---|---|---|
| 3,516,545 | 6/1970 | Larkin | 210/195.4 |
| 3,907,672 | 9/1975 | Milne | 210/195.4 |
| 3,977,965 | 8/1976 | Thorlander et al. | 210/11 |
| 4,093,549 | 6/1978 | Wilson | 210/195.4 |
| 4,162,153 | 7/1979 | Spector | 71/12 |
| 4,488,967 | 12/1984 | Block et al. | 210/605 |
| 4,505,813 | 3/1985 | Gravy | 210/202 |
| 4,522,722 | 6/1985 | Nicholas | 210/605 |
| 4,650,585 | 3/1987 | Hong et al. | 210/605 |
| 4,663,044 | 5/1987 | Goronszy | 210/903 |
| 4,731,185 | 3/1988 | Chen et al. | 210/605 |
| 4,867,883 | 9/1989 | Daigger et al. | 210/605 |
| 4,966,705 | 10/1990 | Jamieson et al. | 210/195.3 |
| 5,137,636 | 8/1992 | Bundgaard | 210/605 |
| 5,160,043 | 11/1992 | Kos | 210/605 |
| 5,207,899 | 5/1993 | Boyle | 210/138 |
| 5,213,681 | 5/1993 | Kos | 210/605 |
| 5,228,996 | 7/1993 | Landsdell | 210/605 |
| 5,342,523 | 8/1994 | Kuwashima | 210/253 |
| 5,441,640 | 8/1995 | Baxter | 210/195.3 |
| 5,480,548 | 1/1996 | Daigger et al. | 210/605 |
| 5,601,719 | 2/1997 | Hawkins et al. | 210/605 |
| 5,624,563 | 4/1997 | Hawkins | 210/253 |

*Primary Examiner*—Christopher Upton
*Attorney, Agent, or Firm*—Michael Best & Friedrich LLP

[57] ABSTRACT

A waste water system having an embedded separator capable of concentrating activated denitrified sludge, and recycling the denitrified sludge to an anaerobic cell, provides a highly efficient method and apparatus for sewage disposal. The basic system is described in several embodiments which are selected on the basis of the waste water content. The improved system minimizes dilution of mixed liquor, increases hydraulic retention time at the various process points, and conserves energy.

26 Claims, 9 Drawing Sheets

MULTI-PHASE DUAL CYCLE INFLUENT PROCESS

This application claims priority to U.S. Provisional Application Ser. No. 60/022,491, filed Jul. 10, 1996, which is incorporated herein in its entirety by reference.

FIELD OF THE INVENTION

This invention relates to the field of biological waste water treatment, and more particularly, to the use of a combination of sequencing batch reactions and continuous flow processes to effect removal of nutrients, organic matter, and solids.

BACKGROUND OF THE INVENTION

The strategy of utilizing microorganisms, chiefly bacteria contained in an activated sludge, to effect breakdown of organic wastes in influent streams, while simultaneously removing nutrients, is now almost universal in the field of sewage treatment. This raw sewage has a relatively high biological oxygen demand (BOD), and the breakdown products are typically lower molecular weight volatile fatty acids (VFA) such as acetic, propionic, or butyric acids. The composition is also high in suspended solids. Nitrogen is present as ammonia and organic, and phosphorous is present as inorganic phosphates.

It is known that the naturally occurring populations of microorganisms found in activated sludge are highly diverse, and represent a spectrum of genera ranging from strict aerobes to facultative anaerobes to obligate anaerobes. Each of these classes of organisms under appropriate manipulation can achieve some objective of the waste treatment process. Increasingly, it has become an objective of waste water treatment processes to remove nutrients such as total nitrogen including organic nitrogen, ammonia nitrogen, and oxidized nitrogen, and phosphates in addition to achieving removal of organic matter, which can affect delicate ecological balances. An understanding of the metabolism and catabolism of different classes of microbes has led to the design of various treatment protocols taking advantage of these natural processes.

Organic compounds provide food for bacterial growth. The organics, both simple and complex, contained in waste water fuel this growth. Under aerobic conditions, three types of metabolism can occur: (1) substrate oxidation in which organic compounds are converted to carbon dioxide and water; (2) synthesis in which organic compounds and nutrients are converted to cell protoplasm; and (3) endogenous respiration in which protoplasm is converted to carbon dioxide, nutrients, and water, as described in Metcalf & Eddy, *Waste Water Engineering*, 3rd ed., McGraw-Hill: 1991. In addition, energy and a metabolizable carbon source are also needed for nutrient utilization. Under anaerobic conditions, organic compounds can be further fermented to VFAs, primarily by the facultative species. The two principal nutrients requiring removal from waste water are inorganic phosphate and nitrogenous compounds. Influent waste water typically contains organic nitrogen and ammonia in the form of ammonium ($NH_4^+$). Hydrolysis of organic nitrogen and conversion of ammonia to free nitrogen gas ($N_2$) which can readily be stripped from solution to the atmosphere requires two distinct processes. During nitrification, ammonia is converted first to nitrite ($NO_2^-$) by autotrophic oxidation involving Nitrosomonas spp. and related organisms, followed by further oxidation to nitrate ($NO_3^-$) involving Nitrobacter spp. A relatively broad range of heterotrophic facultative organisms then convert nitrate to free nitrogen ($N_2$) in a series of steps. The basic multi-step process for nitrification and denitrification is set forth in the following reactions:

Nitrification:

$$NH_4^+ + 1.5\ O_2 \rightarrow NO_2^- + 2H^+ + H_2O \quad (1)$$

(Nitrosomonas)

$$NO_2^- + 0.5\ O_2 \rightarrow NO_3^- \text{(Nitrobacter)} \quad (2)$$

Denitrification:

$$NO_3^- + \text{organic carbon} \rightarrow N_2 + CO_2 + OH^- \text{ (facult.)} \quad (3)$$

Studies have shown that step (1) is rate limiting for nitrification and that Nitrobacter converts $NO_2^-$ as an electron acceptor very quickly to $NO_3^-$. Meanwhile, denitrification is dependent on the availability of organic carbon sources.

It will be apparent that the nitrogen removal process requires first an aerobic step in which oxidation of ammonia to nitrate occurs (nitrification), followed by an anoxic step in which facultative organisms convert nitrate and nitrite to free nitrogen which can be released (denitrification). The earliest and most basic biological water treatment utilized constant aeration. These are of two treatment methods: fill, reactions and draw, and conventional flow through reaction followed by settling.

In more recent fill, reactions and draw, waste water is introduced to a single tank containing activated sludge. Alternating anaerobic/anoxic and aerobic phases are carried out to attain carbonaceous organic oxidation, nitrification, and denitrification. After settling, the clarified water is drawn off. In the multi-cell system, primary clarified water is mixed with activated sludge to form a mixed liquor, which is then passed through multiple aerobic/anoxic cells in a continuous flow process, and finally it enters a secondary clarifier. A portion of the sludge which settles out is returned to be mixed with waste water to form the mixed liquor. The aeration step helps to create biomass under the two aerobic processes outlined above, and also to nitrify ammonia. Denitrification then occurs to some extent upon establishment of anoxic conditions in the anoxic cells and secondary clarifier. In the latter, denitrification depends only on endogenous respiration.

Modern systems also seek to remove phosphorus species while simultaneously exchanging VFAs for phosphates. Removal of phosphates occurs in two steps and is mediated by a group of phosphorous rich microorganisms (Bio-P), principally Acinetobacter spp. and some Aeromonas. These organisms, when present in sludge passing through an anaerobic zone, use stored energy in the form of polyphosphate to absorb food materials, principally VFA, and store it as poly-β-hydroxybutyrate (PHB). In the process, the organisms release phosphates as the polyphosphates are broken down to release energy. This treatment zone must be anaerobic rather than anoxic, so that it is depleted of nitrates which would otherwise inhibit phosphate release and VFA absorption by the microorganism. Occasionally, raw waste water contains oxidized nitrogen species which may inhibit the process.

In the second step of phosphate removal, the aerobic bacteria contained in the sludge now moving through an aerobic zone metabolize the PHB and take up phosphates as biomass increases. Since more phosphate is taken up by the Bio-P organisms than was previously released, the difference is known as luxury uptake. In many conventional processes, VFAs from primary sludge fermentation is added to provide a carbon source for growth, and a low molecular weight carbonaceous compound such as acetic acid or methanol is added to provide an organic carbon source during denitrification. As cell growth depletes the absorbed organic carbon source with concomitant phosphorus uptake, the organisms switch to endogenous respiration with formation of flocks of senescent cells which settle out typically in a secondary clarifier.

The metabolic characteristics of these classes of organisms have been exploited in configuring a number of industrial processes designed to improve the efficiency of waste water treatment. In the basic A/O system (a single-sludge suspended growth system that combines anaerobic and aerobic sections in sequence), two successive tanks or basins are provided. Influent water first undergoes an anaerobic digestion step in which organics are fermented to VFAs along with phosphorous release and VFA absorption, followed by an aerobic step in a separate tank. The effluent is then further purified by settling in a clarifier From a nutrient standpoint, denitrification can occur in the first tank, with further nitrification of ammonia and stripping of nitrogen gas in the second tank. In this process, the recycling of sludge is important for two reasons: the biomass acts as a source of mixed liquor in the first tank, and the recycled nitrates are denitrified. Phosphates are released under the anaerobic conditions of the first tank, and taken up under the aerobic conditions in the second tank. Examples of a basic A/O type process are disclosed in U.S. Pat. Nos. 4,162,153 (Spector) and 4,522,722 (Nicholas).

Even though there is a coupling of anaerobic and aerobic processes, this system is relatively inefficient, with large volumes of fluid and long retention types. Inorganics, nutrients, and organic matter escape into the clarifier because not all of the dissolved material is distributed properly. Another source of inefficiency is the constant dilution of raw material in the anaerobic tank with recycled sludge containing oxidized nitrogen and new influent.

There are many modifications of the basic A/O type process, which can generally be divided into linear versus sequencing (nonlinear) categories. Variations of the A/O linear configuration include the $A^2O$ process which includes separate anaerobic, anoxic, and aerobic zones with two recycle loops, one from the final clarifier to the anaerobic zone, and one from the aerobic outlet to the anoxic zone. The $A^2O$ system splits the anaerobic and aerobic zones to several cells, and is very similar to the Bardenpho process. The advantage of this system is that it does not compromise the anaerobic zone by recycling material containing high levels of nitrates. Rather the high nitrate material is returned to anoxic conditions for denitrification. The five stage Bardenpho process adds a second anoxic and aerobic zone in series to the anaerobic, anoxic and aerobic $A^2O$ system, but retains the $A^2O$ recycle loops. While theoretically increasing the capacity of the system, it also has the advantage of combining the nutrient/BOD reducing recycle steps with a separate anoxic, aerobic cycle which treats the entire effluent volume.

Other linearly configured treatment systems are disclosed in U.S. Pat. No. 4,271,185 (Chen) in which a second oxic cell is provided after settling and prior to mixing to form mixed liquor, U.S. Pat. No. 4,488,967 which contains a number of linear treatment cells connected by bottom disposed apertures, and U.S. Pat. No. 4,650,585 (Hong) which has a series of anaerobic cells, and aerobic cells interconnected within a treatment series by bottom disposed apertures, but where the anaerobic cell series is connected to the aerobic series by a top disposed aperture, which in turn communicates through a top aperture with a clarifier. An interesting variation is disclosed in U.S. Pat. No. 5,160,043 (Kos) in which recycled sludge from the oxic tank is returned to the anaerobic tank after being retained in an exhaust tank to deplete nitrate levels. Another more complex linear-type system is disclosed in U.S. Pat. No. 5,213,681 (Kos) in which a series of anaerobic/aerobic treatment loops containing an exhaust tank are connected together in series with a terminal recycle after clarification to the influent line.

In the alternating or sequencing reactor systems, mixed liquor or treatment sludge can be directed to more than one tank destination at various times. Thus, a given tank can carry out one treatment process in one step and another treatment process in a different step. There is generally a more efficient use of equipment because each tank or treatment cell is not dedicated to a single treatment step. This provides for considerable flexibility in designing treatment protocols, especially in varying treatment times for different steps in response to the content of the influent.

An early sequencing system is disclosed in U.S. Pat. No. 3,977,965 (Tholander) in which influent is directed to one of two raceways interconnected by a valved conduit. Water entering one raceway can be treated under aerobic or anaerobic condition as desired, passed to the second raceway also capable of varied treatment, and is then discharged to a large clarifier. In a second cycle, influent is directed to the second raceway, passed to the first, and is discharged to the same clarifier. These systems are also known as DE-Ditch processes when influent and mixed liquor is first conditioned in an anaerobic tank. In a variation, a clarifier can be eliminated by using, alternatively, one or the other ditch as a settling container, with clarified water being discharged over an adjustable weir. An advantage of the process is creation of an anoxic zone in a non-aerated ditch, while providing a carbon source for denitrification, in this case by adding influent waste water containing degradable carbon.

Finally, U.S. Pat. No. 5,228,996 (Lansdell) discloses an alternating system having three series of cells linearly interconnected for continuous flow operation in which two of the three cell series are operated aerobically at any given time, and one series operates anoxically. At each treatment cycle, a different set of two series is aerobic, and the other set is quiescent for settling. The system operates without a separate clarifier, and is not equipped with a sludge return. This is possible because the activated sludge is alternately subjected to anoxic or aerobic conditions by changing the conditions in the respective cell series. The alternating conditions thus are the biological equivalent of a return cycle to the counterconditions of an earlier treatment phase.

In a variation of Tholander, U.S. Pat. No. 5,137,636 (Bundgaard) combines the alternating two tank anoxic/aerobic treatment strategy with a second aerobic treatment cell followed by a clarifier. Clarified sludge is returned to the inlet manifold. Phosphate removal is surprisingly efficient in this system which does not contain an ostensible anaerobic zone.

SUMMARY OF THE INVENTION

The goal of modern waste water treatment systems is efficiency and the capability of simultaneously removing nutrients and BOD. Efficiency factors include the size and configuration of tanks or other receptacles, the number and timing of process steps, flexibility in process adjustments, and control of solids formation and distribution in the system. The present invention comprises a process strategy and apparatus which favorably impact these efficiency factors.

More specifically, it is an object of the invention to provide the process control and uniformity of a batch system without interrupting the flow of waste water into the system and treated effluent out of it. A further object is to prevent dilution of mixed liquor with partially nitrified water which occurs in previous sludge recycle loops. It is a still further object to effect the distribution of organic carbon throughout the system. Finally, it is an object of the invention to quickly create a clear supernatant in final stage settling step prior to effluent discharge, without a separate clarifier. Satisfaction of all these objects increases efficiency of the overall process significantly, as will be apparent hereafter.

The present invention embodies a process in which waste water is first mixed anaerobically with a concentrated recycle sludge phase obtained by a phase separation, secondly mixing mixed liquor with a nitrified suspension having both a liquid phase and a solid activated sludge phase under essentially anoxic conditions to denitrify the solution and convert the nitrates to free nitrogen gas and metabolize organic compounds, and thirdly separating the activated sludge phase from the denitrified suspension in a phase separation, for recycling.

Overflow of the mixed denitrified sludge suspension into a separator permits partial separation of the liquid and solid phases with settling of a portion of the solid fraction into a concentrated sludge phase for recycling. Since the concentrated solid phase sludge is mixed directly into mixed liquor, there is minimal dilution of VFAs contained in the waste water, which would result in their earlier depletion as organic carbon and energy sources, as occurs in other processes. The dilution factor of the sludge recycle is typically less than 1Q, preferably less than 0.5Q, and may even be a negative value by appropriate adjustment of the hydrostatic head. The mixing of this mixed liquor with a substantially nitrified suspension is performed in a separate cell, and is continued for a time sufficient to substantially denitrify the oxidized nitrogen. Alternatively, the mixed liquor may be subjected to more than one denitrification or nitrifying step, depending on the nitrogen content of the waste water.

Denitrification results from endogenous respiration. In the separator chamber, the rate of denitrification increases as the concentration of solids increase, thereby accounting for the very low level of oxidized nitrogen in the sludge returning to the anaerobic cell.

The phase separator allows the concentrated activated sludge (greater than 1200 mg/L solids) to be returned to the anaerobic cell resulting in the following:

1. Elimination of any remaining oxidized nitrogen species (nitrate and nitrite) and perhaps also some dissolved oxygen in the recycle sludge from a denitrification cell by reducing the total quantity of return sludge in volume.

2. Since the return concentrated activated sludge goes through a relatively highly concentrated sludge blanket at the bottom of the phased separator, the high endogenous respiration of the concentrated activated sludge (with higher population of living organisms) in the sludge blanket will consume the remaining dissolved oxygen and oxidized nitrogen. Therefore few oxygen-containing species will remain in the limited volume of the return sludge to the anaerobic cell.

3. The reduction of the total return sludge eliminates the dilution and wash out of available raw waste water organic carbon, especially the VFAs, increasing the concentration of VFA and other organic carbon. This results in enhancement of phosphorus release, VFA absorption, and PHB storing of the Bio-P organisms.

4. The reduction of the total return sludge volume also increases the actual waste water and mixed liquor retention time in the anaerobic cell. The longer retention time results in more non-VFA, slowly biodegradable organic carbon species or compounds being converted to VFA, increasing the VFA availability in the anaerobic cell, greater opportunity for Bio-P organism to release phosphorus, absorb VFA, and convert VFA to PHB.

5. Reduction of the dilution factor also promotes the activated sludge population of organisms in the anaerobic cell, thereby enhancing phosphorus release, VFA absorption, and PHB conversion.

In water treatment systems, the volume of influent water entering the system is commonly referred to as "Q" for quantity. In a continuous flow system with 1Q entering the system, the outflow from the system must also be 1Q. In the treatment system, there will be a number of situations where the flow is partially diverted or where flows converge. Thus, the flow at that point may be a fractional or multiple Q. In typical conventional recycle loops, the flow Q of the loop is either 1 or a multiple. If it is 1, then the total Q throughput is 2, and the retention time of liquid in that process step is one half.

In the separator and separation step of the present invention, the flow of the recycle sludge is diverted, so that the important solids component is less than 1Q, and the supernatant which passes to another (aerobic) step is greater than Q. Thus, in the present invention, the recycle sludge mixed with waste water to form mixed liquor under aerobic conditions contains the same amount of solids as 1Q, but is contained in less than 1Q of volume, thereby extending hydraulic retention time and lessening dilution of VFAs thus making it process efficient to recycle to the anaerobic step. In general, any recycle sludge equivalent to 1Q of flow contained in a volume of less than Q will have efficacy, but a recycle volume of less than 0.5Q or 0.25Q is preferred in the practice of the invention. Note that Q can actually attain negative values by an appropriate adjustment of the operating hydrostatic head in the anaerobic cell. Thus a negative flow may occur even if there is still net return solids.

In another aspect of the invention, phosphorous in the form of inorganic phosphates is released into solution by Bio-P organisms, principally the Acinetobacters under anaerobic conditions. Further processing of the mixed liquor under anoxic conditions then permits denitrification. The process for biological removal of both nitrogen and phosphorous thus involves mixing a return sludge containing a solid phase activated sludge component and a liquid phase component with mixed liquor to form a blend under anaerobic conditions.

In a second step, mixed liquor is denitrified under anoxic conditions. The denitrified, inorganic phosphate rich liquid is then aerated in the presence of fresh mixed liquor to remove the phosphates by luxury phosphate uptake. In many Bio-P BNR systems, an easily biodegradable organic compound is added to provide an organic carbon and energy source to fuel phosphate uptake incident to the increase in biomass, and to enhance the denitrification in the anoxic zone. Applicant has discovered that transferring mixed liquor containing organic carbon to any point in the process where extra organic carbon and energy are needed for denitrification, avoids the need for expensive exogenous carbon/energy sources, and extra recycle loops.

After aeration, the biomass is passed through a sludge blanket or filter in a quiescent vessel where the sludge has been allowed to settle. Filtering the sludge blend through a sludge blanket permits further denitrification without appreciable phosphate release. The liquid component of the blend can then be decanted from the system to a discharge outlet.

Applicant has discovered that a highly efficient treatment system embodying the foregoing inventive steps involves a multiphase process in which cycling of the process between two or more sequencing cells results in repeated exposure of residual biomass to successive alternating aerobic and anoxic treatments. The use of a modified batch treatment in several of these phases ensures uniformity in the treatment step and a uniform distribution of microbial populations and suspended solids. A modified sequencing batch reactor for removing organic matter and nutrients while maintaining continuous influent flow into a separator blending vessel with continuous clarified effluent flow from an alternating sequencing vessel in a dual cycle comprises a first cycle in which continuous influent waste water is mixed in a first phase with concentrated sludge under anoxic conditions to form mixed liquor. Part of this mixed liquor is passed to a first sequencing vessel where it is mixed with a nitrified suspension containing a solid sludge component and a liquid component to form a blend. This is important because this step combines the organic carbon source contained in the mixed liquor with the population of microorganisms undergoing a high rate of endogenous respiration, thereby supplying a large energy reservoir for denitrification.

Another portion of the mixed liquor is simultaneously transferred to an aeration vessel under conditions of continuous mixing and aeration. The foregoing sets forth the essential process steps in carrying out the waste water treatment in a five chamber system.

The sequencing batch reactor system has the advantages of utilizing the same cell for different process steps and for temporarily isolating the process steps for the benefit of batch uniformity. However, the entire process can be replicated in a flow through system, where each step is assigned to a dedicated cell. Such a system embodies all the inventive aspects set forth herein, and represents yet another embodiment of the invention.

Thus, the present process may vary according to the cycles required to carrying out the particular treatment objective. In the basic denitrification process a mixed liquor is formed under anaerobic conditions from influent waste water and denitrified sludge obtained from the separator. The mixed liquor is combined with nitrified sludge to form a blend, which is mixed under anoxic conditions to obtain substantial but incomplete denitrification. In the separator, the blend which has a suspended solids content capable of being separated by settling into a supernatant and a concentrated sludge portion, separates, and the sediment is recycled by combining with raw waste water to initiate a new round of anoxic denitrification. Further denitrification occurs in the separator as the sludge becomes somewhat compacted by settling, thus accounting for very low levels of oxidized nitrogen in the anaerobic cell.

When mixed liquor is formed under anaerobic conditions, the bio-P microorganisms release phosphates and take up volatile fatty acids. Under the anoxic conditions of denitrification, such phosphate release ceases, and then in a subsequent aerobic step, luxury uptake of phosphorus and further metabolism of VFAs occurs. After filtering through a sludge blanket at the bottom of the open sequencing cell or final clarifier in which treated water enters at the bottom of the cell, the clarified water is discharged. Further variations in the process include mixing the blended mixed liquor and nitrified waste water under anoxic conditions a second time, or aerating a second time depending on the content of the waste water. In each instance, however, there is recycle of activated denitrified sludge sediment back to mixed liquor under anaerobic conditions.

BRIEF DESCRIPTION OF THE DRAWINGS

In FIGS. 4 and 5, the "a" frame shows the spacial configuration of the system, frame "b" depicts the process steps, and also represents a flow through diagram if each step has a dedicated cell, and frame "c" shows the cellular configuration with respect to the separator.

DETAILED DESCRIPTION OF THE PREFERRED EMBODIMENTS

In one aspect of the present invention, release of inorganic phosphate and uptake/utilization of VFA by Acinetobacter spp. and related organisms is facilitated by maintaining strictly anaerobic conditions, high VFA concentrations, and providing concentrated activated sludge having a high population of organisms and mixed liquor suspended solids. The concentrated sludge suspended solids level is typically greater than 2000 mg/L, preferably in a range of at least 1200 mg/L to 2500 mg/L. In most conventional sludge recycle systems, the concentrated sludge is simply redirected to different process cells by pumping through pipes. Organic matter dilutes the suspension contained in the destination cell. In the present invention, a phase separator allows denitrified sludge to sediment by gravity to high concentration, and then be combined directly with influent waste water under anaerobic conditions without transfer by pumping so as to dilute the mixed liquor.

Figure 1:
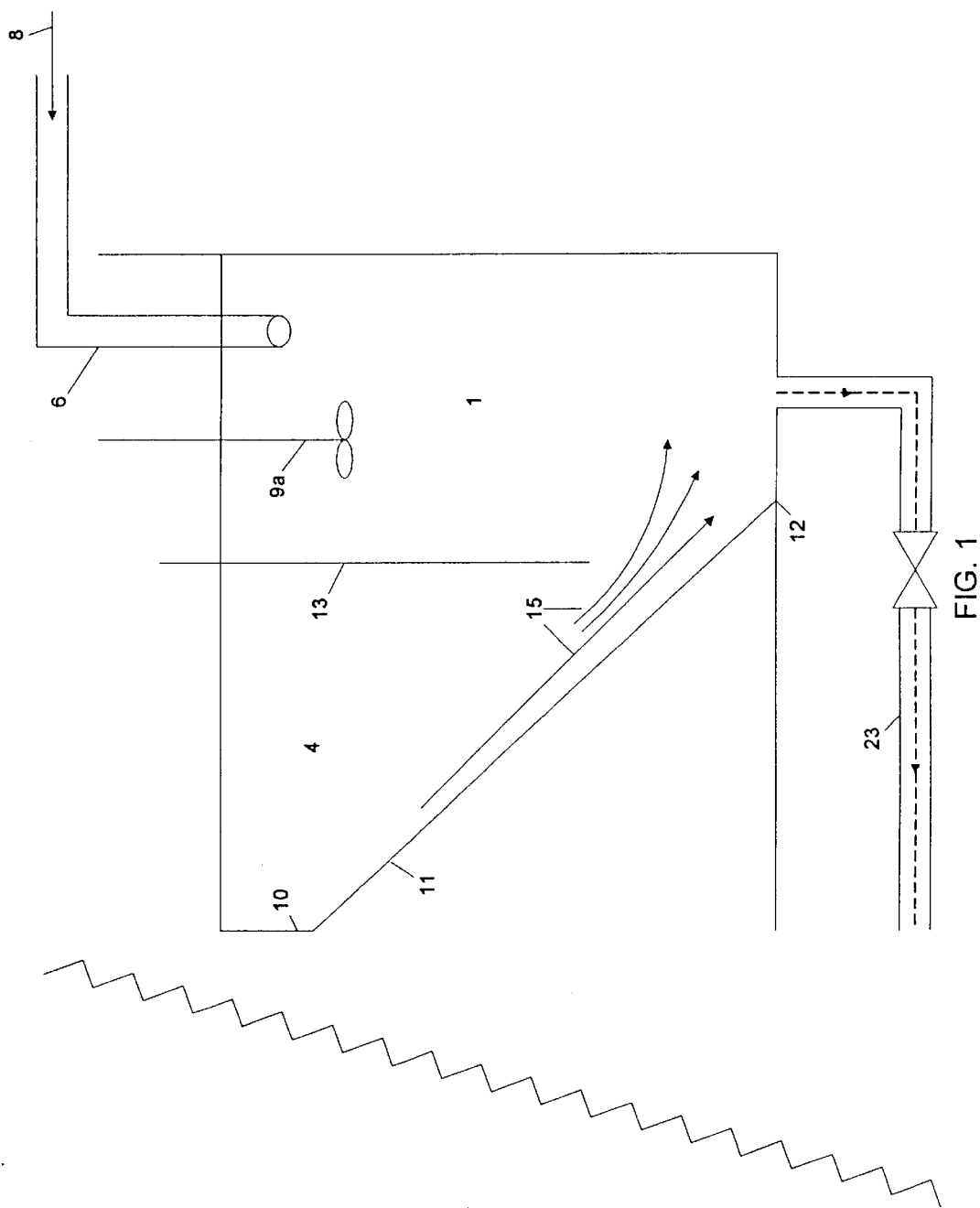
FIG. 1 is a cross sectional view of the separator.

Referring to FIG. 1, a longitudinal cross-section view, the separator comprises an anaerobic reaction reservoir 1 and a separator 4 separated by a generally vertical dividing wall 13. The separation chamber 4 is bounded by two side walls (not shown) and an inclined retaining wall 11 intersecting the bottom wall 12 of the anaerobic reaction reservoir 1. The vertical dividing wall 13 extends only part way to the bottom of the separator thereby providing a communicating aperture 15 through which the sludge sediment passes to the anaerobic reservoir 1 (shown as arrows). FIG. 1 also depicts an influent inlet 6 through which waste water enters the anaerobic reaction cell, mixing means 9a, and an optional conduit 23 for removing mixed liquor.

Water being processed under anoxic conditions either before or after denitrification enters at the top of the separation chamber 4. The supernatant exits at a discharge port or weir 10, and the sediment sludge settles to the bottom of the separation chamber 4. Further concentration of sludge is effected by the inclined wall, which through gravity forces the sediment into a progressively smaller volume. The settled sludge is resuspended by the mixing action within the anaerobic reaction reservoir 1. A high recycle rate causing dilution of the return sludge is thereby avoided. The two chamber separator has several advantages over conventional recycling.

In the present separator, the recycled sludge only minimally dilutes the mixed liquor. This is important because the sludge contains the Bio-P microorganisms which take up VFAs and release inorganic phosphates in the anaerobic reaction cell. The VFAs are a source of organic carbon and energy for the microorganisms, and the process is much more efficient at high VFA concentration. By reducing dilution of the mixed liquor, the mixed liquor can also act as an organic carbon and energy source during subsequent denitrification, thereby avoiding the need for exogenous sources. This obviates the need, as in conventional systems, for return to the primary sludge fermenter, an extra procedure which includes not only primary sludge fermentation, but also a sludge thickening step. A second advantage is that the concentration of oxidized nitrogen in the sediment due to denitrification through endogenous respiration of high concentration of microorganisms at the bottom of the separator, is quite low, resulting in a low total quantity of oxidized nitrogen entering the anaerobic cell, so that the sludge recycle does not disturb the anaerobic condition of the anaerobic reactor reservoir. A third advantage is that, because of the lower dilution of the mixed liquor, the total volume of suspension moving through the anaerobic reactor cell is less for any given flow rate, so that the hydraulic retention time (HRT) increases. This means there is better conversion of organic matter in the influent water to VFAs than in conventional processes, and there is more PHB storage in the Bio-P bacteria. Greater conversion of VFAs and greater phosphorous release is achieved from increased HRT.

From the foregoing, it is apparent that the separator as disclosed performs the intended function of avoiding the substantial dilution of influent water and mixed liquor in prior art processes efficiently, and without expenditure of energy, the separation itself taking place by gravity with blending of the concentrated sludge via a mixing action in the reservoir. The separator apparatus as disclosed herein is very efficient in its construction, with no pumping or other conveying means being required to transfer the solids contained in a given volume of liquid back to the anaerobic cell. In fact, however, in different embodiments of the present method, a gravity clarifier unit might be positioned between the sludge return and the anaerobic cell, to accomplish much the same function, but without the same efficiency. It is therefore intended that the separation can be carried out by any means known in the art for transferring a sludge sediment to a vessel of mixed liquor with a dilution factor less than 1Q of flow in the recycle loop, and preferably a dilution factor of less than 0.5Q.

The communicating two cell construction of the separator/anaerobic reaction cell may be configured in several ways. The geometry and volume of the respective cells or chambers are dictated largely by the anticipated content and flow rate of the waste water. The basic requirements are that (1) the anaerobic reactor reservoir is a mixing chamber with continuous agitation sufficient to resuspend densely settled sludge which settles to a lower chamber portion of the separation chamber, (2) the walls of the separation chamber or separator chamber be generally downwardly inclined, so that sedimenting sludge will be compacted, and (3) there be a communicating aperture at the base of the separator chamber, and a lower portion of the mixing chamber in proximity thereto, to receive the sludge into the base of the anaerobic reservoir. The downwardly inclining walls may be three sided, or even circular. The size of the aperture may be adjusted to accommodate the amount of sludge to be recycled.

Figure 2:
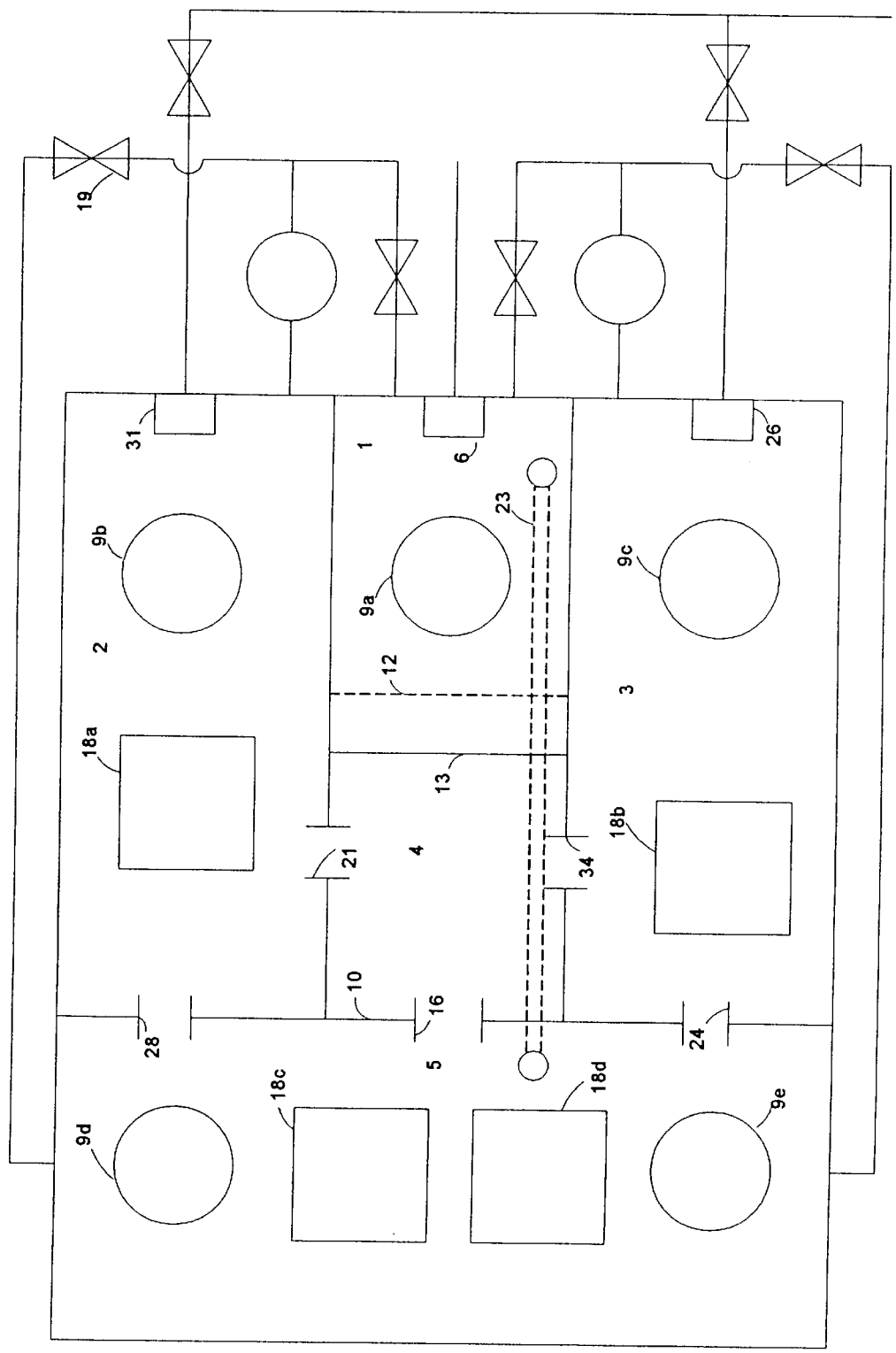
FIG. 2 is plan view of the configuration of cells in a typical four tank sequencing batch reactor.
Figure 4A:
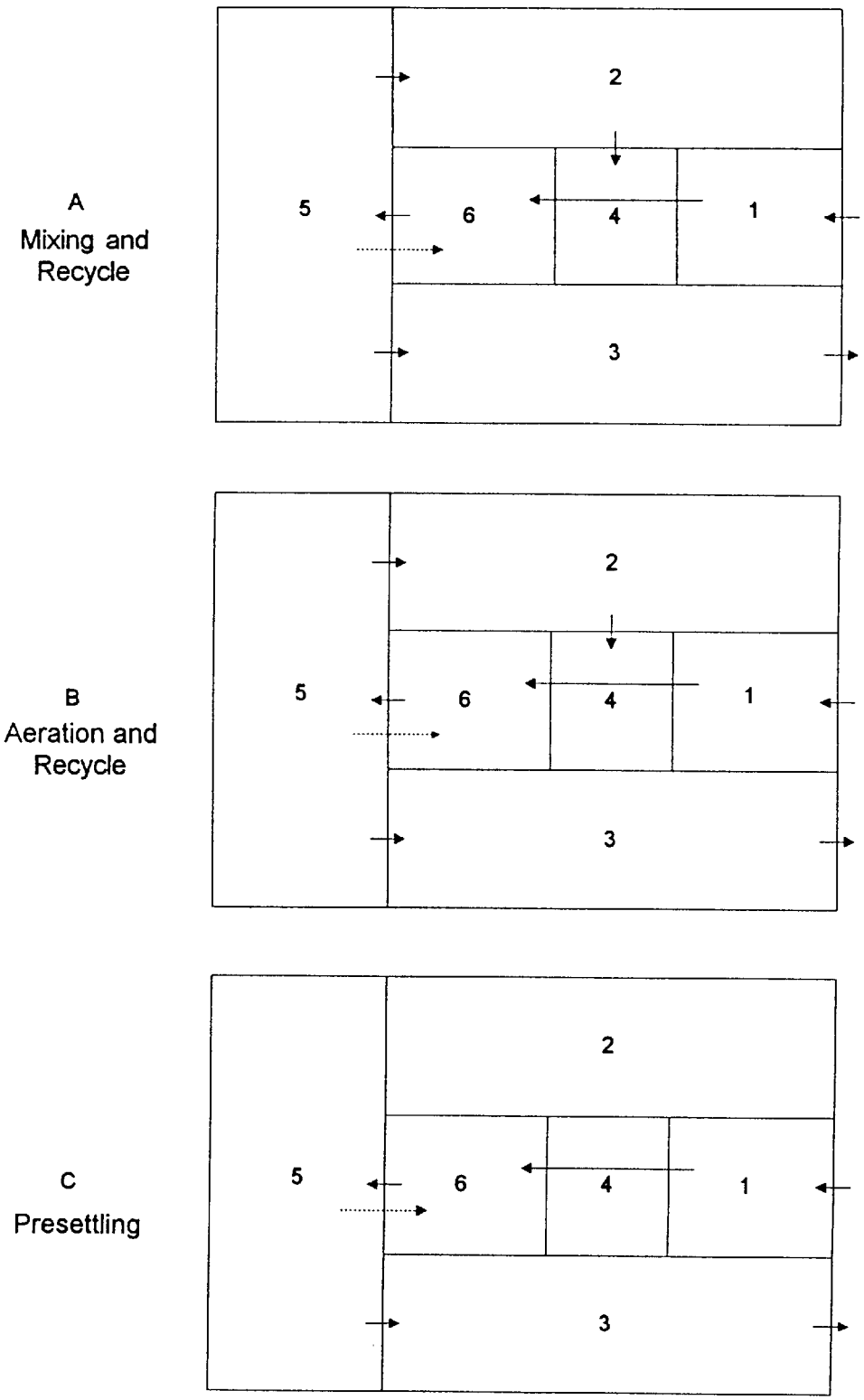
FIG. 4a–c are plan views of the configuration of a system having an anoxic cell interposed between the mixed liquor cell and the aerobic cell.

In all of the process variations of the present invention, mixed liquor is combined with highly nitrified waste water, and is treated under anoxic conditions to achieve denitrification. In a first embodiment as illustrated in FIG. 2, mixed liquor is combined with a nitrified suspension prior to separation with sludge recycle. In a second embodiment as illustrated in FIG. 4a, denitrification occurs after phase separation and sludge recycle. The first embodiment has the advantage of maintaining substantially all of the suspension contained in the separator cell 4 under anoxic conditions thus reducing the probability that any oxidized nitrogen will remain to inhibit phosphate release in the anaerobic reactor reservoir. The advantage of the second embodiment is that the process cycle is simplified by allowing simultaneous phosphorous removal and denitrification, as will be apparent hereafter.

Figure 5A:
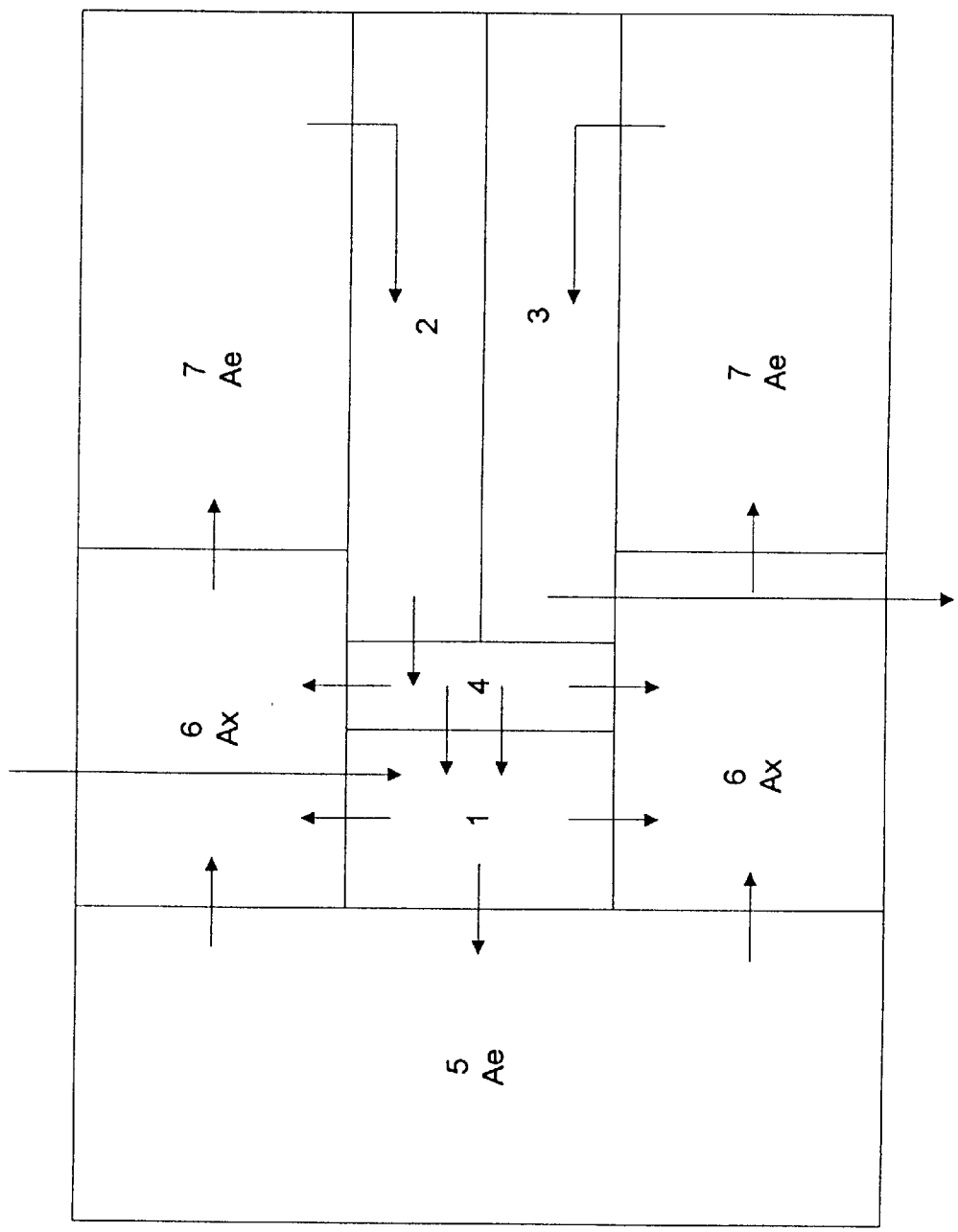
FIG. 5a–c is another embodiment of the sequencing batch reactor system in which a second aeration step is included.
Figure 5B:
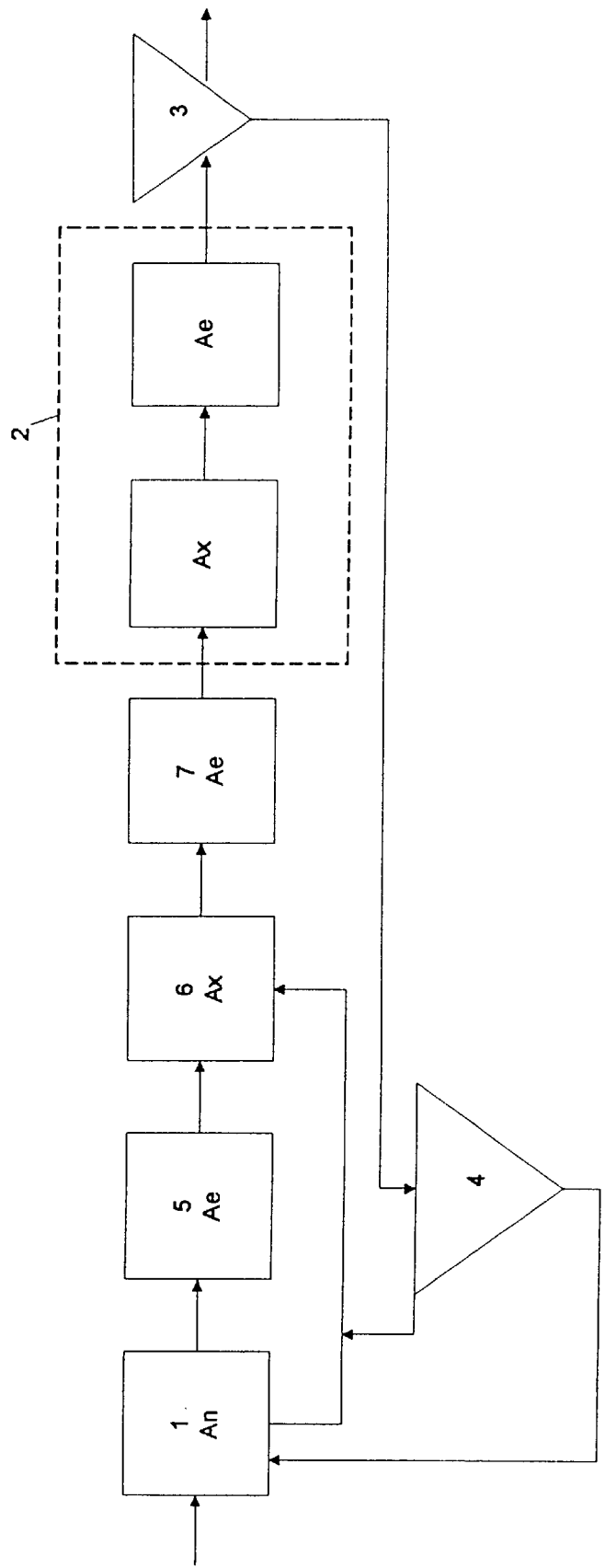
Figure 5C:
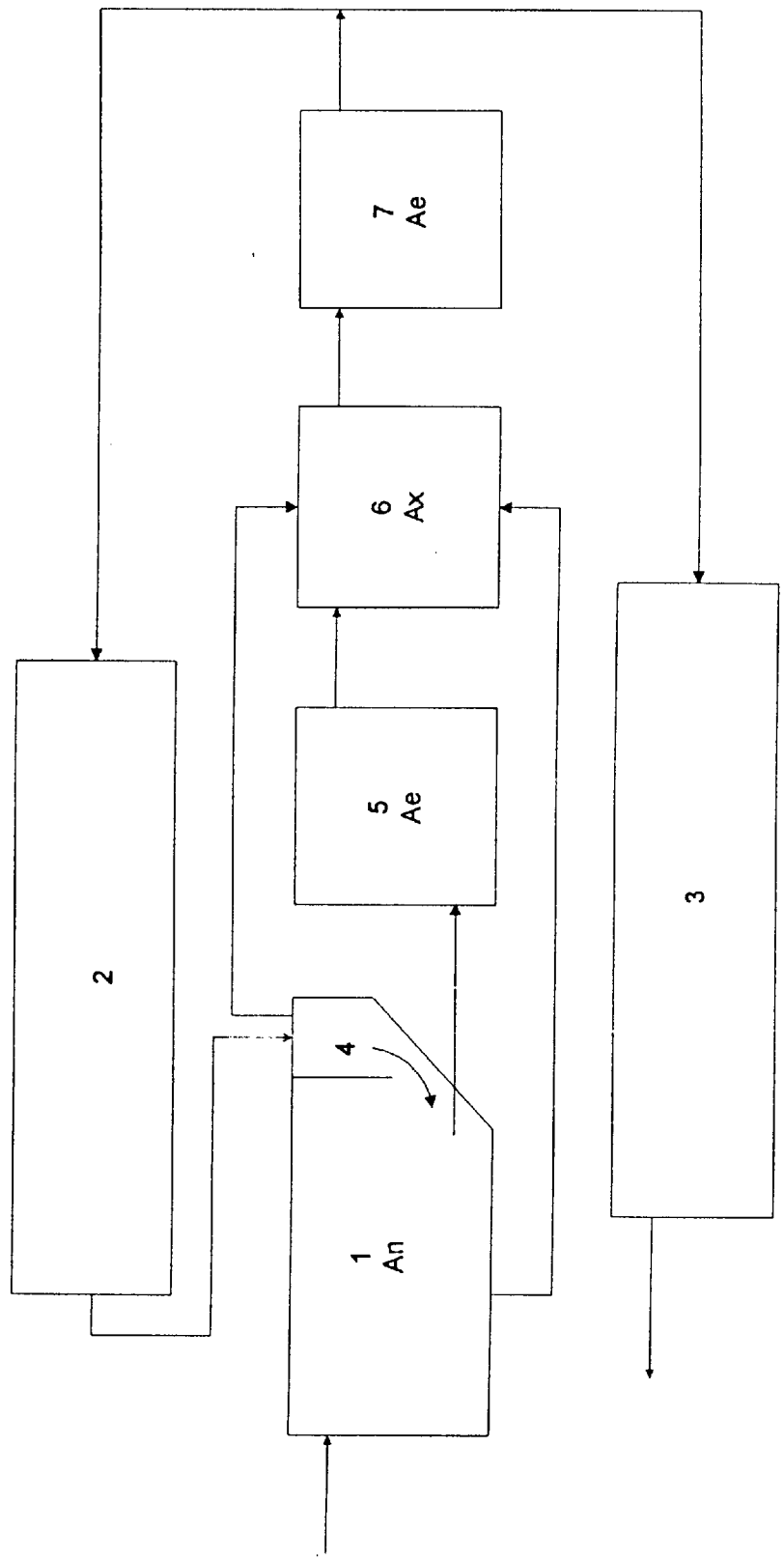

The denitrification step is followed by an aerobic treatment step in which oxygen is provided by an aeration means while the suspension is vigorously mixed. The aerator is any conventional design; however, sizing of the apparatus according to recognized engineering principles is strongly advised, so that excess energy is not expended. The nitrification results in the conversion of organic and ammonia nitrogen to nitrate. Luxury uptake of inorganic phosphate occurs during aeration with concomitant aerobic metabolism of PHB stored within the Bio-P organisms. Efficient use of oxygen is important to cost containment. For example, there should not be a recycling of aerated waste water to an anoxic zone, because reestablishment of anaerobic conditions is energetically expensive, and contrary to nutrient removal strategy. After a period of quiescent settling, the clarified water can be discharged from the system. Applicant has discovered that the mixed liquor containing the organic carbon of influent waste water is an excellent organic carbon and energy source for denitrification as shown in FIGS. 5a–c. Diversion of a portion of the mixed liquor to the anoxic cell(s) eliminates the need for external organic carbon sources. The utility of mixed liquor for this purpose is enhanced by the minimal dilution thereof by recycling mixed liquor.

FIG. 2 is a diagrammatic representation of one embodiment of a waste water treatment system embodying the principles of the present invention. The system comprises a basin segregated into a plurality of distinct treatment cells, or compartments. These treatment cells are an influent anaerobic reaction reservoir 1, a first sequencing treatment cell 2, a second sequencing treatment cell 3, a separation chamber 4, and an aeration cell 5. The biological treatment process comprises two (2) consecutive cycles, each consisting essentially of five (5) successive phases to provide a total of ten (10) phases. The treatment system and process accommodate a continuous influent of untreated, or raw waste water simultaneous with continuous discharge of effluent water.

In Phase No. 1 of Cycle No. 1 in the treatment process, raw waste water influent is continuously passed through influent means 6 into the influent anaerobic reaction cell 1. Therein, the influent is mixed on a continuous basis by the mixing means 9a with activated sludge from the adjacent separation chamber 4 to produce mixed liquor under substantially anaerobic conditions. The mixing means 9a employed to mix the contents of the influent anaerobic reaction cell 1, and those 9b–e of the two sequencing treatment cells 2, 3 and aeration cell 5, are illustrated symbolically within the context of the drawings, however the mixing means 9a–e may consist of any one of, or a combination of any conventional means known in the art.

The settled sludge in the separation chamber 4 passes in a downward direction along the downwardly inclined wall 11, into the lower portion of the influent anaerobic reaction cell 1. While the sludge passes downwardly along the inclined wall 11 into the lower portion of the influent anaerobic reaction reservoir 1 to be mixed to form mixed liquor, substantially clear supernatant is passed from the upper portion of the separation chamber 4 to the aeration cell 5 through a controllable transfer means 16. By passing settled activated sludge into the influent anaerobic reaction cell 1 and by passing supernatant into the aeration cell 5, the separation chamber 4 serves as an internal dedicated phase separator. The contents of the aeration cell 5 are continuously mixed and aerated throughout the entirety of the ten-phase, dual-cycle treatment process.

Similar to the mixing means 9a–e, the aeration means 18a–d employed to aerate the contents of the aeration cell 5 and those of the two sequencing treatment cells 2, 3 are illustrated symbolically within the context of the drawings; however the aeration means 18a–d may consist of any one of, or a combination of, any conventional means known in the art. Simultaneously, mixed liquor is recycled from the influent anaerobic reaction cell 1 to the first sequencing treatment cell 2 via a controllable recycle means 19. The contents of the first sequencing treatment cell 2, consisting of highly nitrified activated sludge suspension from a previous cycle and mixed liquor entering from the anaerobic cell 1, are mixed without aeration. Under these conditions denitrification occurs with the evolution of nitrogen gas.

A portion of the cell 2 contents pass into the separation chamber 4 through a controllable transfer means 21 located between the first sequencing treatment cell 2 and the separation chamber cell 4. Mixed liquor also passes directly from the influent anaerobic reaction cell 1 to the aeration cell 5 via a controllable transfer means 23. This may occur during all of the ten treatment phases. Absorption of the high VFA content of the mixed liquor can be metabolized during aeration. If the mixed liquor transfer occurs during all phases of both treatment cycles, it must occur at a flowrate that is less than, or equal to, the flowrate of mixed liquor recycled from the influent anaerobic reaction cell 1 to one of the sequencing treatment cells 2, 3. Aerated mixed liquor from the aeration cell 5 is passed into the second sequencing treatment cell 3 via a controllable transfer means 24 located between the aeration cell 5 and the second sequencing treatment cell 3. The second sequencing treatment cell 3 serves as a settling zone in all five (5) phases of treatment Cycle No. 1, and substantially clear liquor is passed out of the treatment system through the effluent means 26 located at the end of the second sequencing treatment cell 3.

Phase No. 2 of Cycle No. 1 is essentially the same as Phase No. 1, with the following two exceptions: (1) the recycle flow of mixed liquor from the influent anaerobic reaction cell 1 to the first sequencing treatment cell 2 via the recycle means 19 ceases, and (2) aerated mixed liquor is passed from the aeration cell 5 to the first sequencing treatment cell 2 via a controllable recycle means 19 for anoxic mixing. As in Phase No. 1 of Cycle No. 1, untreated waste water continues to be passed into the influent anaerobic reaction cell 1 where it is mixed by mixing means 9a with activated sludge from the separation chamber 4 under substantially anaerobic conditions to form mixed liquor. Flow of supernatant from the separation chamber 4 to the aeration cell 5 via the transfer means 16 located between the separation chamber 4 and the aeration cell 5 continues. Mixed liquor may also be passed directly from the influent anaerobic reaction cell 1 to the aeration cell 5 via the controllable transfer means 23 connecting the two cells 1, 5. Aerated mixed liquor from the aeration cell 5 continues to pass into the second sequencing treatment cell 3 via the controllable transfer means 24 located between the aeration cell 5 and second sequencing treatment cell 3. The second sequencing treatment cell 3 continues to serve as a settling zone, and substantially clear liquor continues to pass out of the treatment system through the effluent means 26 located at the end of the second sequencing treatment cell 3.

Phase No. 3 of Cycle No. 1 differs from the previous phase in the following three ways: (1) the flow of mixed liquor from the first sequencing treatment cell 2 to the separation chamber 4 via the controllable transfer means 21 located between the separation chamber 4 and the first sequencing treatment cell 2 ceases; (2) the aeration means 18 a employed to aerate the contents of the first sequencing treatment cell 2 continues aeration throughout the entire phase to aerate the mixed liquor, and; (3) aerated mixed liquor from the first sequencing treatment cell 2 is recycled to the aeration cell 5 via the controllable recycle means 19. Flow of aerated mixed liquor passes into the first sequencing treatment cell 2 through the controllable transfer means 28 where it is further aerated and mixed. Aerated mixed liquor continues to pass from the aeration cell 5 to the second sequencing treatment cell 3 via the controllable transfer means 24 located between the aeration cell 5 and the second sequencing treatment cell 3. The second sequencing treatment cell 3 continues to function as a settling zone and substantially clear liquor continues to pass out of the treatment system through the effluent means 26 located at the end of the second sequencing treatment cell 3.

Phase No. 4 of the treatment Cycle 1 differs from the immediately previous Phase No. 3 in two respects: (1) the recycle flow of aerated mixed liquor from the first sequencing treatment cell 2 to the aeration cell 5 via recycle means 19 ceases, and (2) the flow of aerated mixed liquor from the aeration cell 5 to the first sequencing treatment cell 2 via the controllable transfer means 28 located between the aeration cell 5 and the first sequencing treatment cell 2 ceases.

Phase No. 5 of treatment Cycle No. 1 differs from previous Phase No.4 in only one respect: the aerating 18a and mixing 9b means used to aerate and mix the contents of the first sequencing treatment cell 2 cease. This initiates the settling of solid materials within the first sequencing treatment cell 2 in preparation for the passing of substantially clear liquor from cell 2 during the entirety of treatment Cycle No. 2, Phases 1 through 5. The concentration of solids in the settling process enhances filtration of incoming liquid, and allows completion of denitrification by endogenous respiration.

Treatment Cycle No. 2 is a "mirror image" of treatment Cycle No. 1 in terms of the functions of the first and second sequencing treatment cells 2, 3. Their functions "rotate", or "sequence" as each treatment cycle is initiated. Throughout the entirety of treatment Cycle No. 1, Phases 1 through 5, the second sequencing treatment cell 3 serves as a settling zone in which aerated mixed liquor is received from the aeration cell 5 through the controllable transfer means 24 located between the two cells 3, 5 and substantially clear liquor is passed out of the system through the effluent means 26. In treatment Cycle No. 1, Phases 1 through 4, the first sequencing treatment cell 2 serves as a true "treatment" cell where mixing or mixing plus aeration occur. At the initiation of treatment Cycle 2, the two (2) sequencing treatment cells 2, 3 switch roles: the second sequencing treatment cell 3 becomes a "treatment" cell and the first sequencing treatment cell 2 becomes a settling zone.

The following summarizes the significant biological process parameters occurring in each of the five phase cycles described hereinabove:

Phase 1: redistribution of suspended solids; anoxic mixing for denitrification together with raw waste containing organic carbon added to enhance denitrification.

Phase 2: redistribution of suspended solids; continued denitrification with consumption of organic carbon and endogenous respiration of microorganism.

Phase 3: redistribution of suspended solids; aeration for removing remaining organic carbon; stabilization of suspended solids, and stripping the formed nitrogen gas.

Phase 4: continued aeration without distribution of suspended solids between cells 2 or 3 and aeration cell 5.

Phase 5: flocculation and settling to create a sludge blanket for final polishing in the next cycle.

Figure 3:
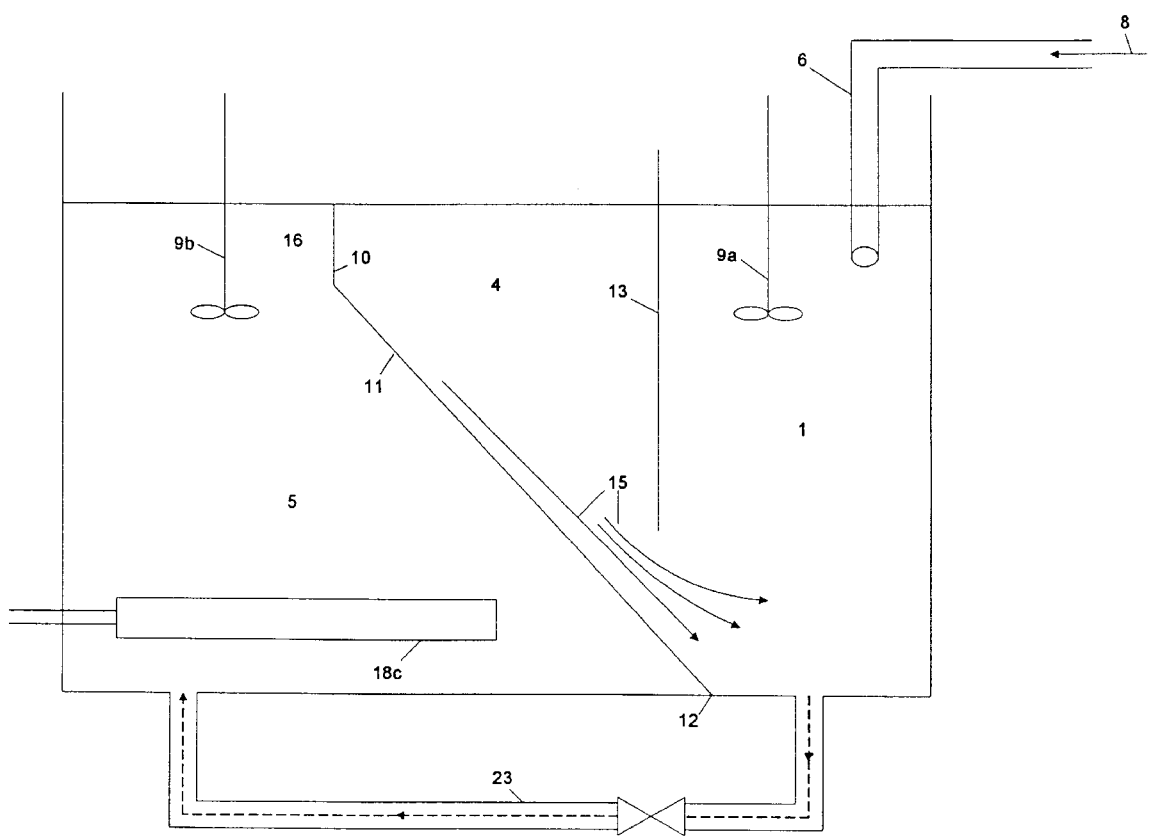
FIG. 3 is a cross sectional view showing the position of the aeration cell in the system disclosed in FIG. 2.

FIG. 3 is a longitudinal cross-sectional view of the separator depicted in FIG. 1, showing, in addition, the relation of the aeration cell 5 to the settling chamber 4 of the separator, according to the configuration set forth in FIG. 2. In this embodiment, supernatant from the settling chamber 4 passes directly to the aeration cell 5 via means 10. The source of the supernatant is partially clarified, denitrified water from the anoxic cell. Also depicted are the mixing means 9b and the aeration means 18c. FIG. 3 also shows the transfer of mixed liquor from cell 1 to aeration cell 5 via transfer means 23.

In an alternate embodiment, the process is shortened by eliminating recycling to the side cell 2 or 3. Referring to FIG. 4a, in a first phase, mixed liquor is passed to an anoxic cell 6 interposed between the separator and the aerobic cell 5 depicted in FIG. 2. The arrows indicate the directionality of flow among the cells. Thus, in Phase 1, mixed liquor formed anaerobically in the reservoir 1 proceeds to denitrification in the dedicated anoxic cell 6 before flowing into the aerobic cell 5. A portion of the aerated suspension is passed through a first sequencing cell 2, while a second portion of equal volume is passed through a sludge blanket in sequencing cell 3, acting as a clarification tank. Thus, the separator functions in this embodiment to collect concentrated sludge from a nitrified and partially denitrified suspension. Since the oxidized nitrogen is soluble, it passes to the anoxic cell in the supernatant, whereas the sediment is sufficiently low in nitrate quantity not to interfere with the anaerobic processes in reservoir 1. The recycle line from cell 5 to cell 6, as indicated by the dotted arrow, brings more oxidized nitrogen into the anoxic cell to enhance the denitrification.

Figure 4B:
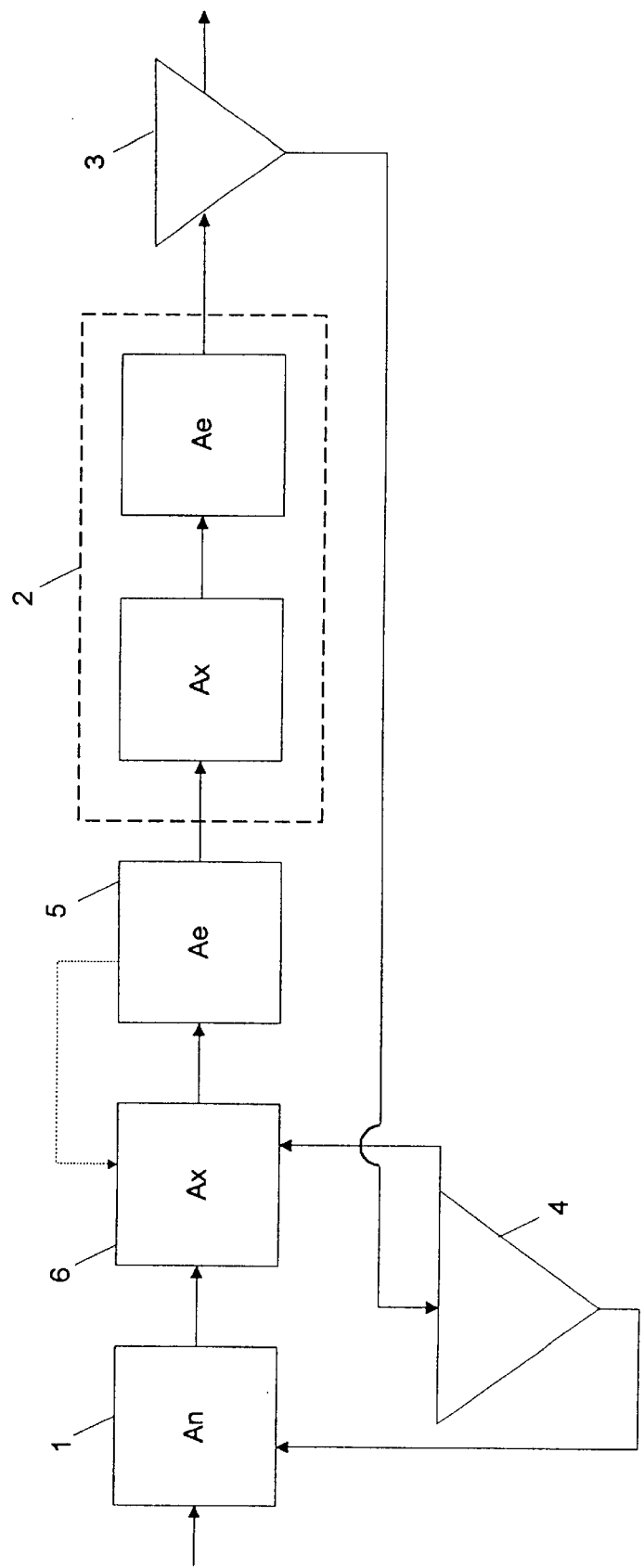
Figure 4C:
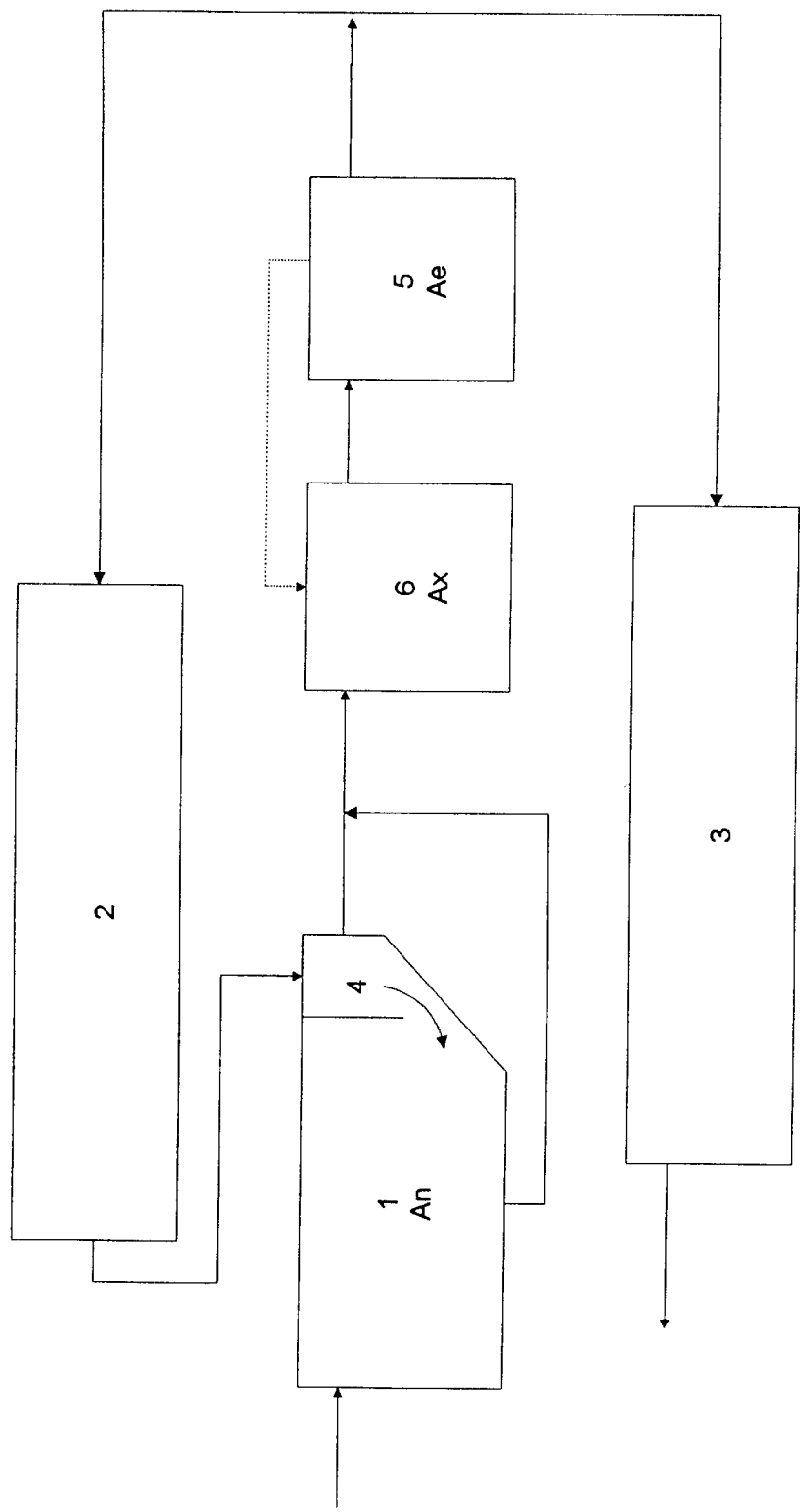

The latter embodiment employs six rather than five cells. It has the advantage of eliminating the pumped recycle to the side cell with Q recycle increasing from 1 to 2 in three steps. FIG. 4b is the flow through system version of the embodiment of FIG. 4a. FIG. 4b is the process configuration of FIG. 4a. FIGS. 4a and 4c diagram the physical configuration of cells for carrying out the process. An, Ax, and Ae are standard abbreviations for anaerobic, anoxic, and aerobic conditions respectively. The numbered cells or steps correlate the process steps to the apparatus cells of corresponding number in FIGS. 2 and 4.

A comparison of the two embodiments reveals many common elements, but also some that differ. In both systems, concentrated sludge is mixed with influent water and mixed liquor to form more mixed liquor in which the dilution factor in combining the sludge is minimal, and the concentration of suspended solids is greater than 1500 mg/L in the sludge. There is also a feed step which delivers mixed liquor as an organic carbon source to any point in the process where external energy would otherwise be required, as in phosphorus release or denitrification.

The processes differ in that the denitrification takes place mainly in a separate anoxic cell in the six cell system, and it occurs only in the sequencing treatment cell in the five cell system. The separator in the five cell system operates as effectively as the six cell system in the anaerobic phase, possibly because the nitrates generated during aeration are in the supernatant phase which is drawn off to the anoxic cell 6.

In a further embodiment shown in FIG. 5a, an anoxic cell 6 and a further secondary aeration cell 7 are interposed between the main aeration cell 5 and the sequencing treatment cells 2 and 3. This variation is especially efficacious in situations in which the influent organic and ammonia nitrogen is unusually high, as the system provides two sequential denitrification steps. An important feature of the system is the split flow of mixed liquor. Mixed liquor is combined with the supernatant discharge from the separator before entering the main anoxic cell 6, which is the equivalent of adding mixed liquor to the sequencing treatment cell 2 in FIG. 2. Since organic carbon is required for effective denitrification, a portion of the split flow of mixed liquor from the anaerobic cell containing high concentrations of organic carbonaceous materials is added to the anoxic cell 6.

The precise number and timing of process steps is largely dictated by the composition of the influent waste water. In a typical cycle for the five cell system, a 10–15 minute feeding of mixed liquor to an anoxic cell and the aeration cell is followed by anoxic mixing leading to denitrification. This is generally the longest process step, running 50–70 minutes. Aeration in the cell will occupy only about 15–20 minutes total time including the mixing phase combining the water under continuous aeration in the aeration cell with the side cell water. This permits very efficient utilization of oxygen, low oxygen demand due to low endogenous respiration rate with less organism population, and the preparing of the cell for settling and clarification. The presettling stage lasts 30 to 40 minutes, and results in formation of an efficient sludge filter clarifying the entering suspended solids.

In the treatment system, the average solids level is about 2000–2800 mg/L. In the cell after settling, solids often reach 4000–5000 mg/L. In a conventional anaerobic cell (such as UCT process), the concentration of solids is usually only 50% of other cells due to the dilution factor. In the present invention, the solids content in the anaerobic cell is maintained higher than the remaining cells. In this unique mixed liquor, the concentration of VFAs in the anaerobic cell ranges from 80–150 mg/L, nearly double the concentration in other phosphorous removal in common waste waters. This is accomplished through solids separation with less than 10 percent volume dilution. Thus, the nutritive mixed liquor capable of providing a food source at critical process points such as anoxic denitrification and aerobic luxury phosphorus uptake by Bio-P has a solids content of 800–1500 mg/L and a VFA content of 80–150 mg/L. By varying the process cycles and regulating the flow among the various cells, the suspended solids content can vary, but maintaining the organic carbon content in the mixed liquor of the anoxic cell at this high level permits utilization of the raw waste as an organic carbon source without additional external chemicals such as methanol.

While the sequencing batch reactor system has the advantages of economies of space, and the uniformity of the batch step, it is possible to carry out all the important steps of the inventive process in a flow through mode. This means that instead of utilizing the sequencing treatment cells for multiple successive process steps, there are provided a number of dedicated treatment cells equal to the number of process steps, so that there is no batch treatment at any step. The operation of the flow through mode is illustrated in the FIGS. 4b and 5b, corresponding to the process steps since each process step has a dedicated cell, so that none of the steps occur in batch mode.

Further advantages of the present invention will be apparent from the Example which follows.

EXAMPLE

A pilot study of the four cell system was carried out using apparatus containing cells configured as shown in FIG. 2 for a modified sequencing batch reactor (MSBR®). The system was designed to be overall 6.5 feet wide, 14 feet long, and 7 feet tall, having an average working capacity of 1200 gallons. Flow was adjusted so that 1200 gallons could be processed daily. The system treated raw sewerage obtained from the municipal waste water treatment facility at Rockton, Ill.

The following abbreviations apply to the table of data showing the results:

COD=chemical oxygen demand
$BOD_5$=biological oxygen demand (5 days)
TSS=total suspended solids
TKN=total kjeldahl nitrogen
$NH_4$—N=ammonia nitrogen
$NO_3$—N=nitrate nitrogen
$NO_2$—N=nitrite nitrogen
TN=total nitrogen
TP=total phosphorus
VSS=volatile suspended solids
Ortho P=orthophosphorus ($PO_4^{-3}$)
MLSS=mixed liquor suspended solids The system required an operational hydraulic retention time of 24 hours because of the high nitrogen content of the waste water.

The MSBR® pilot unit consisted of the following general components: aeration system, controls, mixers, pumps, tankage and valves. All controls, mixers, motors, and valves were designed for on/off duty and extended operation life.

Almost all of the existing biological phosphorus removal processes (such as Bardenpho, A/O, and UCT) have an anaerobic recycle flow of 1Q (an average daily raw waste water flowrate) or higher. Recycle flows that contain no readily biodegradable organic carbon (RBCOD) source will dilute the carbonaceous organic concentration and VFA concentration in the anaerobic cell. A 1Q recycle means the available VFA and RBCOD in the anaerobic cell are reduced by one half. With the phase separator, the recycle flow to the anaerobic cell is decreased to 0.2Q to 0.3Q. This means the VFA dilution reduced the recycle to only about 15 to 20%. Without considering other positive factors, the VFA concentration in the anaerobic cell will increase to more than 60% as compared with a 1Q anaerobic recycle system. The reduced recycle flow enhances the PHB storage for the Bio-P organisms, which in turn brings about a higher driving force for phosphorus uptake in the later stages.

The low recycle flow can provide a higher actual HRT. When the recycle flow entering the anaerobic cell drops from 1Q to 0.25Q, the total flow through the anaerobic cell is decreased from 2Q to 1.25Q. This will increase the actual HRT by 60% for the anaerobic cell. The longer anaerobic HRT allows ordinary heterotrophs to convert more non-VFA RBCOD to VFA through acid fermentation. This increases the VFA concentration. The longer HRT also allows Bio-P organisms to have more time for storage of available VFA's and for converting it to PHB. Therefore, more phosphorus can be taken up in the following denitrification and oxidation steps when the PHB is metabolized inside of the Bio-P organism, improving the phosphorus removal efficiency.

During the first step of the half cycle, mixed liquor is transferred from the anaerobic cell to the sequencing treatment cell instead of directly feeding raw waste water to the sequencing treatment cell. This allows an increase in organic carbon concentration in the sequencing treatment cell which can enhance the denitrification rate in the cell. The stored PHB inside the Bio-P organisms from the transferred mixed liquor will be metabolized along with phosphorus uptake and denitrification using nitrate and nitrite as electron acceptors, more efficiently utilizing the available organic carbon source. Other PHB stored in the Bio-P organism will be oxidized in the main aeration cell and the sequencing treatment cell during the aeration time along with phosphorus uptake.

The fully automated, skid-mounted MSBR pilot unit used in this study was configured as shown in FIG. 2. The pilot unit was fabricated from painted carbon steel, with the internal reactor dimensions of 75"×94" with a 48" sidewell depth to a accommodate a 42" depth of water. The total volume of the reactor was about 1280 gallons at above water depth. Steel slots were incorporated into the bottom and sides of the reactor to facilitate the insertion of flexible fiberglass sheets. These sheets served as movable walls and baffles which could be adjusted to simulate various system treatment configurations.

After start up of the system, the geographical area experienced an unexpectedly early winter. The low temperatures (<5° C.) made the start up very difficult with a very slow growth of microorganisms.

Once mechanical problems were corrected and the operation temperature was raised above 10° C., the effluent total phosphorus dropped to less than 1 mg/L while effluent Ortho-phosphorus decreased to less than 0.5 mg/L. The system removed an average of 11.4 mg/L of total phosphorus, a 93 percent of removal, during the period. The results showed that the existing nitrite in the raw waste water and recycle flow would reduce phosphorus removal efficiency in a biological phosphorus system. The unique design of the phase separator for the recycle activated sludge prevented the oxidized nitrogen from the recycle flow from entering the anaerobic cell and simultaneously diluting the organic carbon in the anaerobic cell. Although the system received an average of 28 mg/L of oxidized nitrogen from the raw waste water, the system still maintained a very low phosphorus discharge, especially the soluble Ortho-phosphate. The elimination of the nitrate/nitrite recycle prevented any additional oxidized nitrite loading to the anaerobic cell. Without dilution, the highly available organic carbon could denitrify the oxidized nitrogen from the raw waste water quickly. These results show that the developed system can efficiently remove phosphorus from waste water even when the raw waste water contains significant amounts of oxidized nitrogen.

One week after the start of this data collection, microscopic examination showed that only a few stalked ciliated protozoa and crawling protozoa with some flagellated protozoa were in the activated sludge, indicating a young sludge age. The young sludge age with an insufficient microorganism population created some level of dispersed bacteria in the system, causing some cloudiness in the effluent. During the first half of this period, the final effluent TSS remained above 30 mg/L. The effluent TSS discharge was improved when more stalked ciliated protozoa and crawling protozoa were built up. By the end of the period, the effluent total suspended dropped to less than 5 mg/L. The final effluent suspended solids averaged 16.5 mg/L for the two week period. The young sludge age also limited the population of nitrifiers, which brought the final effluent $NH_4$—N to an average of 2.8 mg/L. The growth of the microorganism population subsequently improved the nitrification of the system. The effluent $NH_4$—N decreased to about 1 mg/L near the end of the data collection.

A jet-heater kept the reactor temperature at an average of 17° C. To enhance the nitrification under the limited nitrifier population, the system was operated at a total HRT of 24 hours with an aeration HRT of 9.8 hours. The average MLSS was 2,495 mg/L. To build up the microorganism population in the system, only scums were wasted from the system with no sludge wasting during the period.

The system achieved good treatment results especially for the phosphorus removal near the end of the study.

Overall, the data collected demonstrate that the MSBR process is capable of achieving high waste water treatment efficiently in a simple, small volume, single tank unit. With this simply-operated and fully-automated system, high influent of $BOD_5$, TSS, nitrogen, and even phosphorus can be removed at low capital and operating costs.

| Summary of MSBR ® Pilot Study | | | |
|---|---|---|---|
| | Influent, mg/l | Effluent, mg/l | Removal, % |
| $BOD_5$ | 310 | 13.5 | 96 |
| TSS | 332 | 16.5 | 95 |
| VSS | 288 | 12.5 | 96 |
| TKN | 48.5 | 5.75 | 88 |
| $NH_4$-N | 28 | 2.8 | N/A |
| $NO_3$-N | 4.7 | 3.4 | N/A |
| $NO_2$-N | 23.2 | 3.25 | N/A |
| TN | 76.5 | 12.4 | 84 |
| TP | 12.3 | 0.90 | 93 |
| Ortho P | 6.8 | 0.57 | N/A |

HRT = 24 hrs
(4 hrs anaerobic, 1.3 hrs liquid solids phased separator, 8 hrs main aeration)
(5.35 hrs for each sequencing treatment cell)
Temperature = 17° C.

What is claimed is:

1. A waste water treatment system for combining concentrated activated sludge with influent waste water to form a mixed liquor, the waste water treatment system comprising:

a separator chamber for containing mixed liquor including activated sludge, said separator chamber including at least one downwardly inclined wall and having a lower chamber portion for containing settled concentrated activated sludge;

a mixing chamber having an inlet for receiving influent waste water, a bottom portion, and a communicating aperture communicating between said lower chamber portion of said separator chamber and said bottom portion such that said bottom portion receives settled concentrated activated sludge from said lower chamber at a level a mixer disposed in said mixing chamber at a level sufficient to agitate the contents thereof, such that the concentrated activated sludge separating in said separator chamber and settling in lower chamber portion thereof in proximity to said communicating aperture will be drawn into said mixing chamber and mixed with the influent waste water; and a treatment chamber having an inlet in fluid communication with said mixing chamber and for receiving mixed liquor, a mixer disposed therein for agitating a blend of mixed liquor and an activated sludge suspension, and first transfer means positioned between said treatment chamber and said separator chamber, said first transfer means for transferring a portion of the contents in said treatment chamber into said separator chamber.

2. The treatment system of claim 1, wherein said separator chamber includes discharge means for discharging supernatant separated from the mixed liquor including activated sludge.

3. The treatment system of claim 1, wherein said treatment chamber includes valve communication means disposed between said treatment chamber and said mixing chamber for receiving mixed liquor from said treatment chamber.

4. The treatment system of claim 3, further comprising:

a second treatment chamber having a second mixer disposed therein for agitating a blend of mixed liquor and an activated sludge suspension;

second transfer means positioned between said second treatment chamber and said separator chamber, said second transfer means for transferring a portion of the contents in said second treatment chamber into said separator chamber; and second valve communication means disposed between said second treatment chamber and said mixing chamber for receiving mixed liquor from said treatment chamber.

5. A biological treatment system for removing nutrients and BOD from waste water, the biological treatment system comprising:

a separator blending vessel having an influent waste water port, a separator chamber including at least one downwardly inclined wall, and a lower chamber portion for collecting settling sludge, and said separator blending vessel further having a mixing chamber in fluid communication with said waste water port, said mixing chamber including a bottom portion communicating with said lower chamber portion of said separator chamber;

at least two sequencing vessels having valved connecting means between said mixing chamber of said separator blending vessel and each of said sequencing vessels, and a mixer disposed in at least one of said sequencing vessels capable of agitiating a solution contained therein;

an aeration vessel having a bottom, valved connecting means at said bottom of said aeration vessel communicating with each of said sequencing vessels, and first transfer means communicating with said separator chamber of said separator blending vessel; and each of said sequencing vessels having a discharge port for continuous discharge of clarified effluent waste water.

6. The biological treatment system of claim 5, wherein said mixing chamber of said separator blending vessel is fluidly interconnected with said aeration vessel.

7. The biological treatment system of claim 5, further comprising fluid transfer means disposed between at least one of said sequencing vessels and said separator chamber of said separator blending vessel.

8. The biological treatment system of claim 5, further comprising:

an anoxic sequencing vessel fluidly interposed between said separator chamber and said aeration vessel, said anoxic sequencing vessel having first fluid transfer means disposed between said anoxic sequencing vessel and said mixing chamber of said separator blending vessel and second fluid transfer means disposed between said anoxic sequencing vessel and said aeration vessel.

9. The biological treatment system of claim 5, wherein at least one of said sequencing vessels includes means for filtering treated waste water received from said aeration vessel through a sludge blanket.

10. The biological treatment system of claim 5, wherein said aeration vessel includes a mixer for agitating the contents of said aeration vessel.

11. A waste water treatment system for denitrifying waste water containing organic matter, said treatment system comprising:
    a separator blending vessel including
        a separator chamber for separating a substantially denitrified blend of treated waste water into a supernatant portion and a concentrated sludge portion, said separator chamber having at least one downwardly inclined wall, a lower chamber portion for collecting sludge settled from the denitrified blend, and separator chamber transfer means for discharging supernatant, and
        a mixing chamber for forming a mixed liquor of influent waste water and substantially denitrified sludge, said mixing chamber including an influent port for receiving influent waste water, a bottom portion communicating with said lower chamber portion of said separator chamber and for receiving substantially denitrified sludge therefrom; and
    a first treatment chamber for combining mixed liquor with nitrified sludge, said treatment chamber having an inlet disposed in fluid communication with said mixing chamber of said separator blending vessel so as to receive mixed liquor therefrom, a mixer for agitating a blend of the mixed liquor and nitrified sludge to produce a substantially denitrified blend, and a discharge port disposed in fluid communication with said separator chamber and for discharging a portion of the substantially denitrified blend into said separator chamber.

12. The waste water treatment system of claim 11, further comprising a second treatment chamber for receiving supernatant from said separator chamber transfer means.

13. The treatment system of claim 12, wherein said second treatment chamber includes an aeration vessel.

14. The waste water treatment system of claim 13, wherein said mixing chamber is disposed in fluid communication with said second treatment chamber, such that a portion of the mixed liquor can be passed into said aeration vessel.

15. The treatment system of claim 13, further comprising a clarifier vessel in fluid communication with said aeration vessel and for receiving treated waste water therefrom, said clarifier vessel having an effluent port for discharging clarified water.

16. The treatment system of claim 15, wherein said clarifier vessel includes means for filtering the treated waste water received from said aeration vessel through a sludge blanket.

17. The treatment system of claim 16, wherein said aeration vessel includes valve communication means disposed at a bottom of said aeration vessel, said valve communication means being operable to pass treated waste water from said aeration vessel through said sludge blanket in said clarifier vessel.

18. The treatment system of claim 13, wherein said aeration vessel includes controllable transfer means disposed between said first treatment chamber and said aeration vessel.

19. The treatment system of claim 12, wherein said second treatment chamber is fluidly interconnected with said mixing chamber such that mixed liquor can be passed from said mixing chamber to said second treatment chamber.

20. A waste water treatment system for removing organic matter and inorganic nutrients from influent waste water, said treatment system comprising:
    a separator blending vessel including
        a separator chamber for receiving a blend of waste water containing sludge, said separator chamber having a separator chamber inlet, at least one downwardly inclined wall, a lower chamber portion for collecting sludge settling from the blend, and separator chamber discharge means for discharging supernatant; and
        a mixing chamber for mixing influent waste water with concentrated sludge to form a mixed liquor, said mixing chamber including an influent port for receiving influent waste water, a mixer, a bottom portion communicating with said lower chamber portion of said separator chamber and for receiving settled sludge therefrom; and
    a first treatment cell for mixing a blend of the mixed liquor and a nitrified suspension, said first treatment cell having a mixer, a controllable inlet fluidly interconnected with said mixing chamber so as to receive mixed liquor therefrom, and first discharge means for discharging a portion of the blend to said separator through said separator chamber inlet; and
    an aeration vessel having an inlet for receiving supernatant from said separator chamber discharge means.

21. The treatment system of claim 20, further comprising controllable transfer means fluidly interconnecting said mixing chamber and said aeration vessel and for transferring mixed liquor from said mixing chamber to said aeration vessel.

22. The treatment system of claim 20, further comprising controllable transfer means fluidly interconnecting said aeration vessel with said first treatment cell.

23. The treatment system of claim 20, further comprising a second treatment cell, said second treatment cell having an inlet for receiving treated waste water from said aeration vessel and an effluent discharge port for discharging clarified waste water.

24. The treatment system of claim 23, wherein said aeration vessel has an aeration vessel outlet disposed at the bottom of said aeration vessel, and wherein said inlet of said second treatment vessel is fluidly interconnected with said aeration vessel outlet.

25. The treatment system of claim 24, wherein said second treatment cell includes means for filtering treated waste water received from said aeration vessel through a sludge blanket.

26. The treatment system of claim 20, further comprising:
    a second treatment cell for mixing a blend of the mixed liquor and a nitrified suspension, said second treatment cell having a second mixer, a second controllable inlet fluidly interconnected with said mixing chamber so as to receive mixed liquor therefrom, and second discharge means for discharging a portion of the blend to said separator; and
    wherein said aeration vessel is selectively fluidly interconnected with each of said first treatment cell and said second treatment cell, and wherein each of said first treatment cell and said second treatment cell includes a discharge port for discharge of clarified effluent waste water.

* * * * *